(12) United States Patent
Wadsworth, Sr.

(10) Patent No.: US 8,256,614 B1
(45) Date of Patent: Sep. 4, 2012

(54) INTERCONNECTED AND ON-SITE SEVERABLE DECK CLIPS WITH COOPERATING INSTALLATION TOOL FOR JOINING TWO ADJACENT DECKING PLANKS TO AN UNDERLYING SUPPORT STRUCTURE

(76) Inventor: Keven R. Wadsworth, Sr., Greenwood, IN (US)

( * ) Notice: Subject to any disclaimer, the term of this patent is extended or adjusted under 35 U.S.C. 154(b) by 1227 days.

(21) Appl. No.: 11/527,282

(22) Filed: Sep. 25, 2006

(51) Int. Cl.
*B65D 69/00* (2006.01)

(52) U.S. Cl. ....... 206/341; 206/340; 206/343; 29/811.2; 221/191; 221/281; 52/177; 52/489.1; 52/712; 52/713; 52/749.1

(58) Field of Classification Search ............ 52/177, 52/489.1, 698, 712, 713, 749.1; 206/340, 206/341, 343, 345; 221/191, 281; 29/566.1, 29/811.2
See application file for complete search history.

(56) References Cited

U.S. PATENT DOCUMENTS

| | | | |
|---|---|---|---|
| 1,184,080 A | 5/1916 | D'Arcy | |
| 2,332,081 A | 10/1943 | Hunt et al. | 20/91 |
| 2,362,252 A | 11/1944 | Ellinwood | 20/4 |
| 2,398,603 A | 4/1946 | Soderberg | 85/49 |
| 2,406,387 A | 8/1946 | Lank | 144/309 |
| 4,198,042 A * | 4/1980 | Olson | 52/489.1 |
| 4,641,988 A | 2/1987 | Ganner | 403/245 |
| 4,682,458 A | 7/1987 | Sparrow | 52/309.8 |
| 4,733,460 A * | 3/1988 | Auger et al. | 29/811.2 |
| 4,940,163 A * | 7/1990 | Baillet et al. | 221/191 |
| 5,004,027 A | 4/1991 | Legler et al. | 144/136 R |
| 5,182,891 A | 2/1993 | Slocum | 52/480 |
| 5,251,996 A | 10/1993 | Hiller et al. | 404/406.1 |
| 5,267,391 A * | 12/1993 | Ingraham | 29/566.1 |
| 5,377,732 A | 1/1995 | Fujii et al. | 144/347 |
| 5,458,433 A | 10/1995 | Stastny | 403/408.1 |
| 5,480,117 A | 1/1996 | Fleming, III | 248/231.9 |
| 5,529,428 A | 6/1996 | Bischof | 403/408.1 |
| 5,623,803 A | 4/1997 | Willis | 52/650.3 |
| 5,660,016 A | 8/1997 | Erwin et al. | 52/483.1 |
| 6,129,206 A * | 10/2000 | Cooper | 206/343 |
| 6,314,699 B1 | 11/2001 | West | 52/489.1 |
| 6,402,415 B1 | 6/2002 | Eberle, III | 403/231 |
| 6,594,961 B2 | 7/2003 | Leines | 52/177 |
| 6,651,398 B2 * | 11/2003 | Gregori | 52/489.1 |
| 6,851,884 B2 | 2/2005 | Eberle | 403/231 |

* cited by examiner

*Primary Examiner* — Brian E Glessner
*Assistant Examiner* — Matthew J Smith
(74) *Attorney, Agent, or Firm* — Bernard S. Hoffman

(57) ABSTRACT

Interconnected and on-site severable deck clips with cooperating installation tool for joining two adjacent decking planks to an underlying support structure. The deck clips are interconnected and on-site severable, are attached to the underlying support structure, and engage the two adjacent decking planks so as to fasten the two adjacent decking planks to the underlying support structure without a need for nails or screws to pass through the two adjacent decking planks. The installation tool is hand-held, removably receives a number of the deck clips, and feeds the deck clips one at a time to fasten to the underlying support structure, and when a deck clip is fastened to the underlying support structure, the deck clip is severed from the other deck clips in the installation tool and a next deck clip is feed by way of the installation tool and attached to the underlying support structure to engage the two adjacent decking planks.

62 Claims, 4 Drawing Sheets

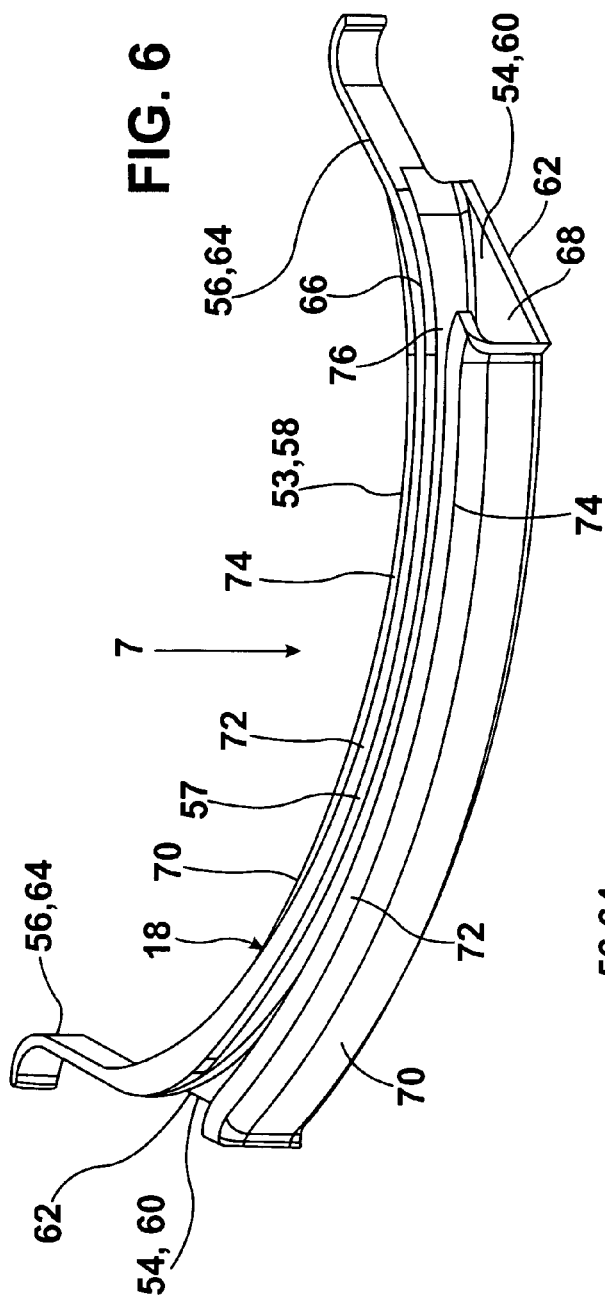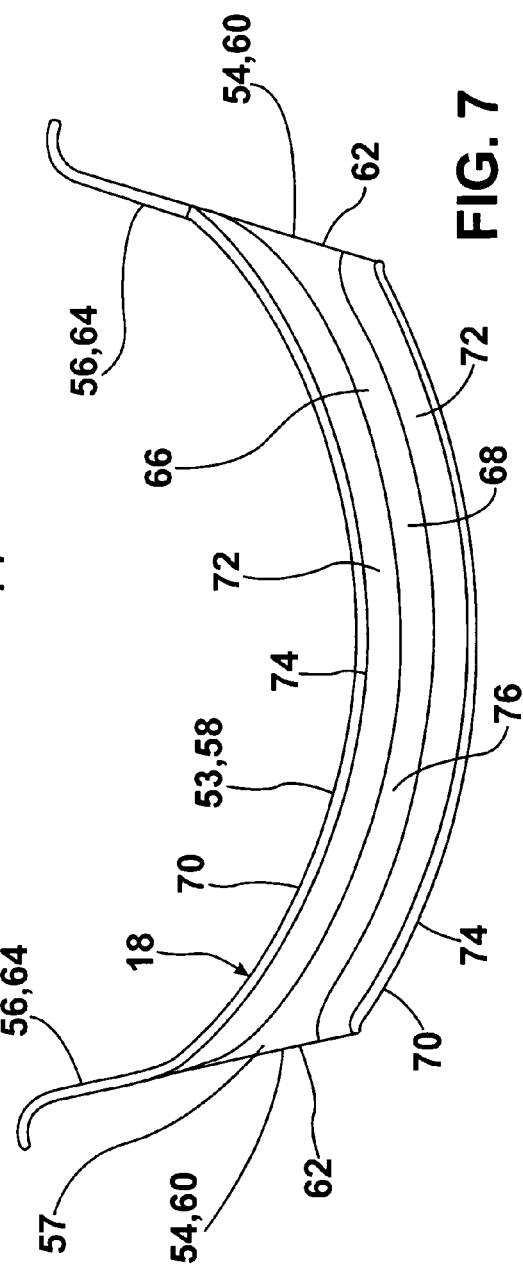

INTERCONNECTED AND ON-SITE SEVERABLE DECK CLIPS WITH COOPERATING INSTALLATION TOOL FOR JOINING TWO ADJACENT DECKING PLANKS TO AN UNDERLYING SUPPORT STRUCTURE

1. CROSS REFERENCE TO RELATED APPLICATIONS

The instant non-provisional patent application contains subject matter disclosed in Wadsworth, Sr.'s Disclosure Document Number 572,852, filed on Mar. 17, 2005, and entitled THE WADSWORTH DECK CLIP SYSTEM, and as such, Wadsworth, Sr. respectfully requests that this Disclosure Document be retained for more that the requisite 2 years and be made a part of the file of the instant non-provisional patent application, and as such, be incorporated herein by reference thereto.

2. BACKGROUND OF THE INVENTION

A. Field of the Invention

The embodiments of the present invention relate to a clip for joining two adjacent decking planks to an underlying support structure, and more particularly, the embodiments of the present invention relate to interconnected and on-site severable deck clips with cooperating installation tool for joining two adjacent decking planks to an underlying support structure.

B. Description of the Prior Art

Outdoor decks have become increasingly popular in residential home construction. Homes and apartments, as well as a variety of other buildings, often incorporate exterior decks into their design. Additionally, decks are commonly added onto existing structures. These decks provide convenient space for a variety of outdoor activities, including cookouts, dining, and sunbathing, as well as other leisure activities. Exterior decks typically include a floor space fabricated from a number of decking planks and an underlying support structure, including posts, beams, and joists.

Typical deck construction includes a number of vertical posts supporting the remaining structure above the ground, horizontal beams supported above the ground by the vertical posts, a number of horizontal joists being parallel to and uniformly spaced-apart from one another and anchored to the horizontal beams, and a floor surface of decking planks arranged horizontally and perpendicular to the horizontal joists.

Traditionally, the decking planks have been wooden components of standard dimension, commonly 2" by 6" lumber. The traditional manner of attaching the decking planks to the underlying horizontal joists is by nailing or screwing through the decking plank into the horizontal joist below. Although this attachment method may be adequate for standard all-wood deck constructions, it does present a number of disadvantages. For example, nail or screw heads exposed on the top surface of the decking planks are not only aesthetically unappealing, but may present tripping hazards as well. This risk is enhanced over time as the nails may be pried upwards away from the horizontal joists by flexing of the decking planks caused by repeated foot traffic. Additionally, the use of nails or screws necessarily creates holes in the decking planks, which may cause the wood to split and which may accelerate deterioration of the plank caused by weather or insects.

If the horizontal joists and the decking planks are fabricated from different materials of construction, the decking planks and the underlying horizontal joists may expand or contract at differing rates as a result of ambient temperature and humidity fluctuations. These differences in rates of expansion and contraction can result in unacceptably uneven spacing, stress build-up within the construction components, cracking, or buckling.

Thus, there exists a need for a decking attachment system that eliminates a need for nails or screws to pass through and fasten the decking planks to the underlying support structure and the disadvantages associated therewith, securely anchors the decking planks to the underlying support structure, and allows for relative movement between the decking planks and the underlying support structure in a lengthwise direction of the decking planks.

Numerous innovations for fasteners for joining structural components have been provided in the prior art, which will be described below in chronological order to show advancement in the art, and which are incorporated herein by reference thereto. Even though these innovations may be suitable for the specific individual purposes to which they address, they each differ in structure, and/or operation, and/or purpose from the embodiments of the present invention, in that they do not teach interconnected and on-site severable deck clips with cooperating installation tool for joining two adjacent decking planks to an underlying support structure.

(1) U.S. Pat. No. 1,184,080 to D'Arcy.

U.S. Pat. No. 1,184,080 issued to D'Arcy on May 23, 1916 teaches a combination of frame pieces disposed at an angle to each other and plate-like corner irons having angularly disposed flanges. The plate-like corner irons are arranged in opposed pairs on the sides of and secured to the ends of meeting frame pieces, with their flanges engaging the inner edges thereof in overlapping telescoping relation to each other. Inner flanges have vertical nail slots therein and brads on their edges driven into the frame pieces. The outer flanges have nail perforations opposite the nail slots. Nails are disposed through the perforations and slots and driven into the frame pieces.

(2) U.S. Pat. No. 2,332,081 to Hunt et al.

U.S. Pat. No. 2,332,081 issued to Hunt et al. on Oct. 19, 1943 in class 20 and subclass 91 teaches a panel, including wooden strips joined along their edges with glue. Each wooden strip has at least one groove in its edge matching a groove in the edge of the adjoining wooden strip. An asbestos millboard spline is fitted in the matching grooves and bridges the joint between the wooden strips. Cross bands cover the wooden strips on both sides of the panel and veneers cover the cross bands.

(3) U.S. Pat. No. 2,362,252 to Ellinwood.

U.S. Pat. No. 2,362,252 issued to Ellinwood on Nov. 7, 1944 in class 20 and subclass 4 teaches a wall structure, including a pair of adjacent wallboard panels having meeting edges. Each of the wallboard panels is formed with a groove opening into its meeting edge. The groove in each wallboard panel provides an outer lip and an inner lip. The outer lips are in abutting relation. A joining strip is permanently secured to the under surface of the outer lips. The inner lips are spaced. A "T"-shaped connecting member is movably positioned in the groove and has a base in spaced relation to the inner lips. Apparatus anchors the connecting member to a structural element.

(4) U.S. Pat. No. 2,398,603 to Soderberg.

U.S. Pat. No. 2,398,603 issued to Soderberg on Apr. 16, 1946 in class 85 and subclass 49 teaches a joining staple, including a metal body having at least two portions extending at right angles to each other and at least two teeth carried upon each of the portions. Each of the teeth include a flat, substantially rectangular body having a cutting edge extending substantially parallel to its body. The cutting edges of all of the teeth are located in one plane. Each of the bodies has another cutting edge extending between the teeth of that body. The second mentioned cutting edges are also located in one plane.

(5) U.S. Pat. No. 2,406,387 to Lank.

U.S. Pat. No. 2,406,387 issued to Lank on Aug. 27, 1946 in class 144 and subclass 309 teaches a method of constructing a plurality of wooden posts, each of which has a connector element incorporated therein adjacent each end thereof. The method includes forming a plurality of longitudinally extending grooves in one side of each of a pair of wooden blanks from which the wooden posts are to be formed, forming a transverse groove adjacent each end of the side of each of the wooden blanks, with the transverse grooves intersecting the longitudinal grooves, providing a pair of connector retaining members with a plurality of seats for receiving connector elements, the number and spacing of the seats in each of the connector retaining members conforms to the number and spacing of the longitudinal grooves in each of the wooden blanks, placing connector elements in each of the seats, positioning the wooden blanks, with their grooved sides together, and with the connector retaining members in the transverse grooves, bonding the wooden blanks together, and severing the thus bonded assembly along longitudinal lines intermediate the longitudinal grooves.

(6) U.S. Pat. No. 4,641,988 to Ganner.

U.S. Pat. No. 4,641,988 issued to Ganner on Feb. 10, 1987 in class 403 and subclass 245 teaches a fitting for releasably joining two plate-shaped structural components extending at a right angle relative to one another. A fitting has a preferably cylindrical-locking element that can be inserted either directly in a bore in the first structural component or it can be inserted indirectly in a housing. A holding piece with a holding projection is anchored in the second structural component. In the assembled position, the holding projection abuts against one or two gripping surfaces of the locking element, which gripping surfaces are of, for example, eccentric shape, and the holding projection is pulled toward the locking element when the locking element is turned. The holding piece is constructed plate-shaped and is insertable in a slot in the second structural component.

(7) U.S. Pat. No. 4,682,458 to Sparrow.

U.S. Pat. No. 4,682,458 issued to Sparrow on Jul. 28, 1987 in class 52 and subclass 309.8 teaches a floor, composed of parallel, spaced beams having flanges and blocks of polystyrene foam that are laid on the flanges to bridge gaps between the beams. Boards are laid on the blocks and are supported by the blocks, which form load-bearing members of the floor. The blocks may have flanged portions extending over the beams so as to provide heat insulation.

(8) U.S. Pat. No. 5,004,027 to Legler et al.

U.S. Pat. No. 5,004,027 issued to Legler et al. on Apr. 2, 1991 in class 144 and subclass 136 R teaches a biscuit joiner for cutting semi-elliptical slots in opposing edges of work pieces that are to be joined along those edges. The joiner includes a housing adapted to be mounted upon the quill of a multi-purpose woodworking tool. The housing encloses a rotary saw blade adapted to be attached to a spindle projecting from the quill on which the housing is mounted. A spring-loaded guide projects from a front face of the housing and has a slot therethrough, so that when the front face of the guide is engaged by an edge of a work piece to be slotted, the guide can be pushed inwardly against spring pressure allowing the rotary-saw blade to be exposed and form a slot in the edge of the work piece. Adjustable stops are provided on the guide, so that a desired depth of cut will automatically be made after adjustment. An alternative construction of the biscuit joiner is especially adapted for use in conjunction with a conventional drill press, with the arbor carrying the saw blade being clamped in the chuck on the drive spindle of the drill motor.

(9) U.S. Pat. No. 5,182,891 to Slocum.

U.S. Pat. No. 5,182,891 issued to Slocum on Feb. 2, 1993 in class 52 and subclass 480 teaches a flooring construction, having a unitary construction with a top layer providing a finished flooring surface and an insulation layer adjacent the top layer. The flooring panel includes an upper portion and a lower portion. The upper portion has a larger dimension than the lower portion and extends outwardly beyond the lower portion. A recessed portion between the upper portion and the lower portion defines a channel. A plurality of interlock support elements having a vertical web and an upper horizontal flange are arranged, so that the horizontal flange extends into the channel. The vertical web extends below the lower portion to raise the flooring.

(10) U.S. Pat. No. 5,251,996 to Hiller et al.

U.S. Pat. No. 5,251,996 issued to Hiller et al. on Oct. 12, 1993 in class 403 and subclass 406.1 teaches a connecting element for connecting two parts generally in a connection plane. The element has a first portion for connecting the element relative to a first of the parts and a second portion for connecting the element relative to the second part. The second portion includes actuation members that on relative movement of the parts substantially along the connection plane, urge the parts forcefully towards each other.

(11) U.S. Pat. No. 5,377,732 to Fujii et al.

U.S. Pat. No. 5,377,732 issued to Fujii et al. on Jan. 3, 1995 in class 144 and subclass 347 teaches a technique for joining wood members. A plurality of slits are formed on end portions of the wood members desired to be joined, and the end portions are abutted with corresponding slits in alignment to form a common surface. Each of the abutted end portions is fixed by a temporary fixing apparatus to a desired joining state. Thereafter, an adhesive agent is applied into interior surfaces of the slits. Connecting plates, e.g., made of a reinforced plastic material coated with the adhesive agent, are inserted into the aligned slits. The adhesive agent is then hardened.

(12) U.S. Pat. No. 5,458,433 to Stastny.

U.S. Pat. No. 5,458,433 issued to Stastny on Oct. 17, 1995 in class 403 and subclass 408.1 teaches a biscuit having an octagonal outer periphery and used to form a joint between first and second work pieces. The biscuit fits within arcuate slots formed in the work pieces, with glue placed in the slots and/or on the biscuit before the joint is put together. The biscuit is made of anhydrous compressed wood.

(13) U.S. Pat. No. 5,480,117 to Fleming III.

U.S. Pat. No. 5,480,117 issued to Fleming III on Jan. 2, 1996 in class 248 and subclass 231.9 teaches a bracket for mounting a rotary lock member in a frame of a panel. The bracket is a preferably "U"-shaped body having a base and two legs extending therefrom. The inner dimension of the bracket is chosen to allow insertion of a rotary lock member therein. Panel engaging steps and protrusions are located on the outside surface of each leg for engaging the frame. The legs of the bracket are biased inwardly towards one another, so that when a locking member is inserted therein, the legs are pressed outwardly driving the protrusions into the frame. A number of bores are located in the bracket to allow supplemental locking members to lock the bracket to the frame.

(14) U.S. Pat. No. 5,529,428 to Bischof.

U.S. Pat. No. 5,529,428 issued to Bischof on Jun. 25, 1996 in class 403 and subclass 408.1 teaches a metallic structural element for connecting work pieces including wood, woodworking material, or plastic. The element includes a lamellar part, which provides a non-positive connection with a first work piece provided with a groove and a transverse hole, and a bolt-like part, which through screwing or pinning realizes the non-positive connection with a second workpiece provided with a longitudinal hole. The lamellar part has in the center a hole that is at right angles to a plane of the lamella part and is intended for fixing in the groove of the work piece. Variants have a wing-like long or rectangular short lamellar part and a bolt-like part in the form of a conical wood screw, cylindrical screw, screw having a metal thread, threaded sleeve, or pin. Accessories include a screwing tool and a drilling template.

(15) U.S. Pat. No. 5,623,803 to Willis.

U.S. Pat. No. 5,623,803 issued to Willis on Apr. 29, 1997 in class 52 and subclass 650.3 teaches a deck structure utilizing recycled plastic lumber decking planks sliding onto a rigid frame. The frame includes supporting members having protruding "T"-shaped connectors selectively fitting into preformed grooves on the underside of the plastic planks. The manner in which the planks are secured to the frame allows for the expansion and contraction of the individual plank lengths as a result of temperature variations. In addition, brackets are provided that fasten railings and the like to the rigid frame.

(16) U.S. Pat. No. 5,660,016 to Erwin et al.

U.S. Pat. No. 5,660,016 issued to Erwin et al. on Aug. 26, 1997 in class 52 and subclass 483.1 teaches an extruded-plastic decking plank for mounting to an underlying support structure. The decking plank has a rigid foam core, a resilient outer plastic shell, and a clamping portion for securing the decking plank to the support structure. A top surface of the decking plank can be provided with a non-slip surface. Also included is an attachment system for securing the decking planks to the support structure by engaging the clamping portions of the decking planks onto clamps or hold down blocks that are secured onto the support structure, and which permit relative motion between the decking planks and the support structure in the decking planks' lengthwise direction to prevent stress and buckling caused by uneven expansion.

(17) U.S. Pat. No. 6,314,699 to West.

U.S. Pat. No. 6,314,699 issued to West on Nov. 13, 2001 in class 52 and subclass 489.1 teaches a deck system with a deck clip. The deck system includes deck boards in which receiving chambers are formed. The receiving chambers are formed in both opposing side edges of each deck board, and each chamber is defined in part by a lip edge. The deck boards are placed side-by-side during construction of a deck, closely spaced, so that the lip edges of adjacent deck boards define a narrow channel space therebetween in which a rotatable deck clip is placed. The clip has a first overhang member and an opposing second overhang member, and is thereby wider in a first horizontal dimension and shorter in a second, perpendicular horizontal dimension, and is rotatably attached to the deck joists by a screw or other fastening device. When the clip is rotated into a first position, its first and second overhang members extend into the receiving chambers of adjacent deck boards and engage with the lip edges of each chamber to hold the deck boards securely in place upon the joists. Users may remove a deck board by simply rotating the clip ninety degrees to thereby move the overhang members of the clip into the channel space between the lip edges, and the deck boards are thereby released.

(18) U.S. Pat. No. 6,402,415 to Eberle III.

U.S. Pat. No. 6,402,415 issued to Eberle III on Jun. 11, 2002 in class 403 and subclass 231 teaches an anchoring biscuit device for joining three boards. It includes a first substantially flat horizontal top element having a generally biscuit-shaped configuration, at least one substantially vertical support member attached to an underside of the top element and extending downwardly therefrom for a predetermined length for joinder of two adjacent boards having been pre-cut with biscuit receiving slots, and an attachment orifice located at least on the top element for attachment of the anchoring biscuit device to a support board for anchoring and support of the two adjacent boards. In one preferred embodiment, a top bevel is included at the orifice to permit angled screwing at positions other than vertical positions. In other embodiments, the screw orifice will have an oval or elongated shape to likewise enable screwing at angles other than vertical. In yet another preferred embodiment, the orifice will both be beveled and elongated.

(19) U.S. Pat. No. 6,594,961 to Leines.

U.S. Pat. No. 6,594,961 issued to Leines on Jul. 22, 2003 in class 52 and subclass 177 teaches a deck plank readily attaching to an engagement clip when force is applied over the plank. When a plurality of clips are attached to underlying joists parallel with the joists, and a plurality of deck planks are oriented to the clip perpendicular to the joist and pushed down over the clips, a deck structure is provided. Each clip has a pair of horizontal flanges, which snap over a plurality of ledges in a channel under each plank. The deck planks are embossed so as to form a slip resistant surface to be walked upon. The plastic extruded deck plank resists rot, deterioration, and insect infection found in current wood products.

(20) U.S. Pat. No. 6,851,884 to Eberle.

U.S. Pat. No. 6,851,884 issued to Eberle on Feb. 8, 2005 in class 403 and subclass 231 teaches an anchoring biscuit device for joining three boards. It includes a first substantially flat horizontal top element having a generally biscuit-shaped configuration, with opposite sidewalls, wherein at least one of the sidewalls has a flat edge, and at least a portion of the sidewalls are non-parallel with respect to one another, at least one substantially vertical support member attached to an underside of the top element and extending downwardly therefrom for a predetermined length for joinder of two adjacent boards having been pre-cut with biscuit receiving slots, and an attachment orifice located at least on the top element for attachment of the anchoring biscuit device to a support board for anchoring and support of the two adjacent boards. In one preferred embodiment, a top bevel is included at the orifice to permit angled screwing at positions other than vertical positions.

It is apparent that numerous innovations for fasteners for joining structural components have been provided in the prior art that are adapted to be used. Furthermore, even though these innovations may be suitable for the specific individual purposes to which they address, they would not be suitable for the purposes of the embodiments of the present invention as heretofore described, namely, interconnected and on-site severable deck clips with cooperating installation tool for joining two adjacent decking planks to an underlying support structure.

3. SUMMARY OF THE INVENTION

Thus, an object of the embodiments of the present invention is to provide interconnected and on-site severable deck clips with cooperating installation tool for joining two adjacent decking planks to an underlying support structure that avoids the disadvantages of the prior art.

Briefly stated, another object of the embodiments of the present invention is to provide interconnected and on-site severable deck clips with cooperating installation tool for joining two adjacent decking planks to an underlying support structure. The deck clips are interconnected and on-site severable, are attached to the underlying support structure, and engage the two adjacent decking planks so as to fasten the two adjacent decking planks to the underlying support structure without a need for nails or screws to pass through the two adjacent decking planks. The installation tool is hand-held, removably receives a number of the deck clips, and feeds the deck clips one at a time to fasten to the underlying support structure, and when a deck clip is fastened to the underlying support structure, the deck clip is severed from the other deck clips in the installation tool and a next deck clip is feed by way of the installation tool and attached to the underlying support structure to engage the two adjacent decking planks.

The novel features which are considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying drawing.

4. BRIEF DESCRIPTION OF THE DRAWING

The figures of the drawing are briefly described as follows:

FIG. 6 is a diagrammatic perspective view of the cooperating installation tool of the interconnected and on-site severable deck clips with cooperating installation tool of the embodiments of the present invention identified by ARROW 6 in FIG. 2; and FIG. 7 is a diagrammatic top plan view taken generally in the direction of ARROW 7 in FIG. 6.

5. LIST OF REFERENCE NUMERALS UTILIZED IN THE DRAWING

A. General

Figure 1:
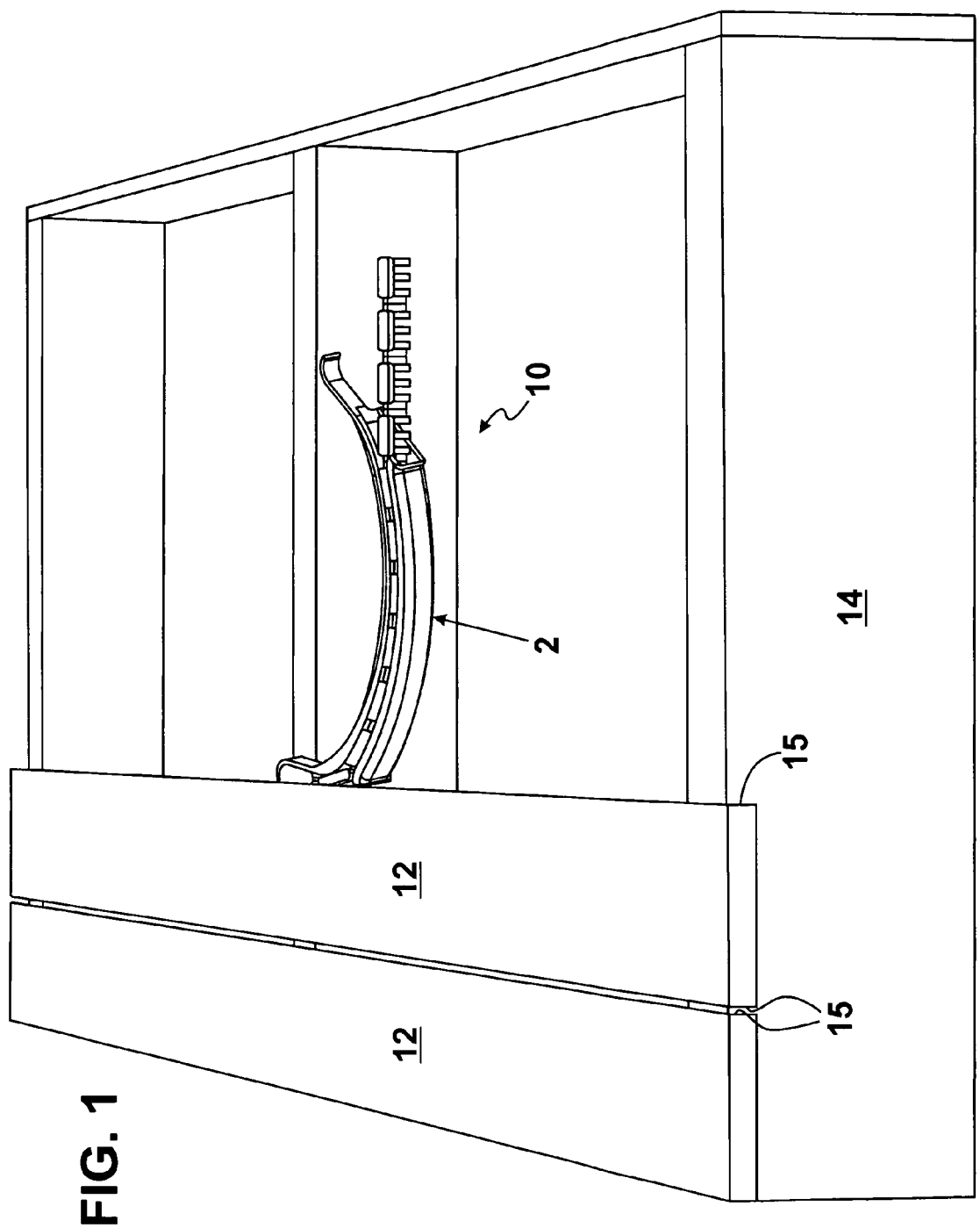
FIG. 1 is a diagrammatic perspective view of the interconnected and on-site severable deck clips with cooperating installation tool of the embodiments of the present invention joining two adjacent decking planks to an underlying support structure.

10 interconnected and on-site severable deck clips with cooperating installation tool of embodiments of present invention for joining two adjacent decking planks 12 to underlying support structure 14

12 two adjacent decking planks

14 underlying support structure

15 edges of two adjacent decking planks 12

B. Interconnected and on-Site Severable Deck Clips with Cooperating Installation Tool 10

16 deck clips for attaching to underlying support structure 14 and for engaging two adjacent decking planks 12 so as to fasten two adjacent decking planks 12 to underlying support structure 14 without need for nails or screws to pass through two adjacent decking planks 12

16*a* deck clip of deck clips 16 fastened to underlying support structure 14 and severed from other deck clips 16 in installation tool 18

16*b* next deck clip of deck clips 16 in installation tool 18

18 installation tool

C. Deck Clip 16

20 first apparatus of each deck clip of deck clips 16 for allowing engagement of associated deck clip 16 with two adjacent decking planks 12 with/without need for biscuit slots to be made in edges of two adjacent decking planks 12

22 second apparatus of each deck clip of deck clips 16 for engaging against underlying support structure 14

24 third apparatus of each deck clip of deck clips 16 for interconnecting adjacent deck clips of deck clips 16 to each other end-to-end

26 fourth apparatus of each deck clip of deck clips 16 for allowing for expansion and contraction of two adjacent decking planks 12

28 fifth apparatus of each deck clip of deck clips 16 for securing each deck clip 16 to underlying support structure 14 without involving two adjacent decking planks 12 so as to avoid damage and splintering to edges 15 of two adjacent decking planks 12

30 head of each deck clip of deck clips 16 for allowing engagement of associated deck clip of deck clips 16 with two adjacent decking planks 12 with/without need for biscuit slots to be made in edges of two adjacent decking planks 12

31 pair of opposing ends of head 30 of each deck clip of deck clips 16

32 body of each deck clip of deck clips 16 for maintaining head 30 of each deck clip of deck clips 16 predetermined distance above underlying support structure 14 so as to account for thickness of two adjacent decking planks 12

33 pair of opposing ends of body 32 of each deck clip of deck clips 16

34 pair of arms of each deck clip of deck clips 16

36 pair of terminal portions 36 of body 32 of each deck clip of deck clips 16

41 aperture in each deck clip of deck clips 16

42 screw/nail of each deck clip of deck clips 16 for securing each deck clip of deck clips 16 to underlying support structure 14 without involving two adjacent decking planks 12 so as to avoid damage and splintering to edges 15 of two adjacent decking planks 12

44 pair of longitudinal sides of head 30 of each deck clip of deck clips 16 for cooperating with profiles in edges of two adjacent decking planks 12 for allowing engagement of each deck clip of deck clips 16 with two adjacent decking planks 12 with/without need for biscuit slots to be made in edges 15 of two adjacent decking planks 12

46 plurality of pins of body 32 of each deck clip of deck clips 16 for maintaining head 30 of each deck clip of deck clips 16 predetermined distance above underlying support structure 14 so as to account for thickness of two adjacent decking planks 12
47 pair of terminal pins of plurality of pins 46 of body 32 of each deck clip of deck clips 16
48 pair of resilient tabs of pair of arms 34 of each deck clip of deck clips 16
52 center pin of plurality of pins 46 of body 32 of each deck clip of deck clips 16 for securing each deck clip of deck clips 16 to underlying support structure 14 without involving two adjacent decking planks 12 so as to avoid damage and splintering to edges 15 of two adjacent decking planks 12

D. Installation Tool 18

53 sixth apparatus of installation tool 18 for maintaining deck clips 16 in-line end-to-end prior to fastening
54 seventh apparatus of installation tool 18 for feeding deck clips 16 one-by-one from sixth apparatus 53 by either left- or right-handed user
56 eighth apparatus of installation tool 18 for maintaining deck clip of deck clips 16 fed by seventh apparatus 54 in position against previously attached decking plank of two adjacent decking planks 12 for fastening to underlying support structure 14
57 ninth apparatus of installation tool 18 for allowing screw/nail 42 of each deck clip of deck clips 16 to be positioned in aperture 41 in associated deck clip of deck clips 16 while associated deck clip of deck clips 16 is still in sixth apparatus 53
58 body of installation tool 18
60 mouth/tail of installation tool 18
62 ends of body 58 of installation tool 18
64 guide of installation tool 18
66 partially open top of body 58 of installation tool 18 for allowing screw/nail 42 of each deck clip of deck clips 16 to be positioned in aperture 41 in associated deck clip of deck clips 16 while associated deck clip of deck clips 16 is still in sixth apparatus 53
68 floor of body 58 of installation tool 18
70 pair of side walls of body 58 of installation tool 18
72 pair of flanges of body 58 of installation tool 18
74 pair of terminal edges of pair of side walls 70 of body 58 of installation tool 18, respectively
76 space between pair of flanges 72 of body 58 of installation tool 18

6. DETAILED DESCRIPTION OF THE PREFERRED EMBODIMENTS

A. General

Referring now to the figures, in which like numerals indicate like parts, and particularly to FIG. 1, which is a diagrammatic perspective view of the interconnected and on-site severable deck clips with cooperating installation tool of the embodiments of the present invention joining two adjacent decking planks to an underlying support structure, the interconnected and on-site severable deck clips with cooperating installation tool of the embodiments of the present invention is shown generally at 10 for joining two adjacent decking planks 12 to an underlying support structure 14, wherein the two adjacent decking planks 12 have edges 15.

B. The Interconnected and on-Site Severable Deck Clips with Cooperating Installation Tool 10

Figure 3:
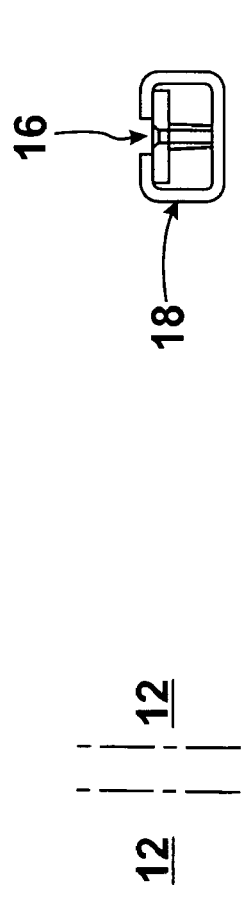
FIG. 3 is a diagrammatic cross sectional view taken along LINE 3-3 in FIG. 2.
Figure 2:
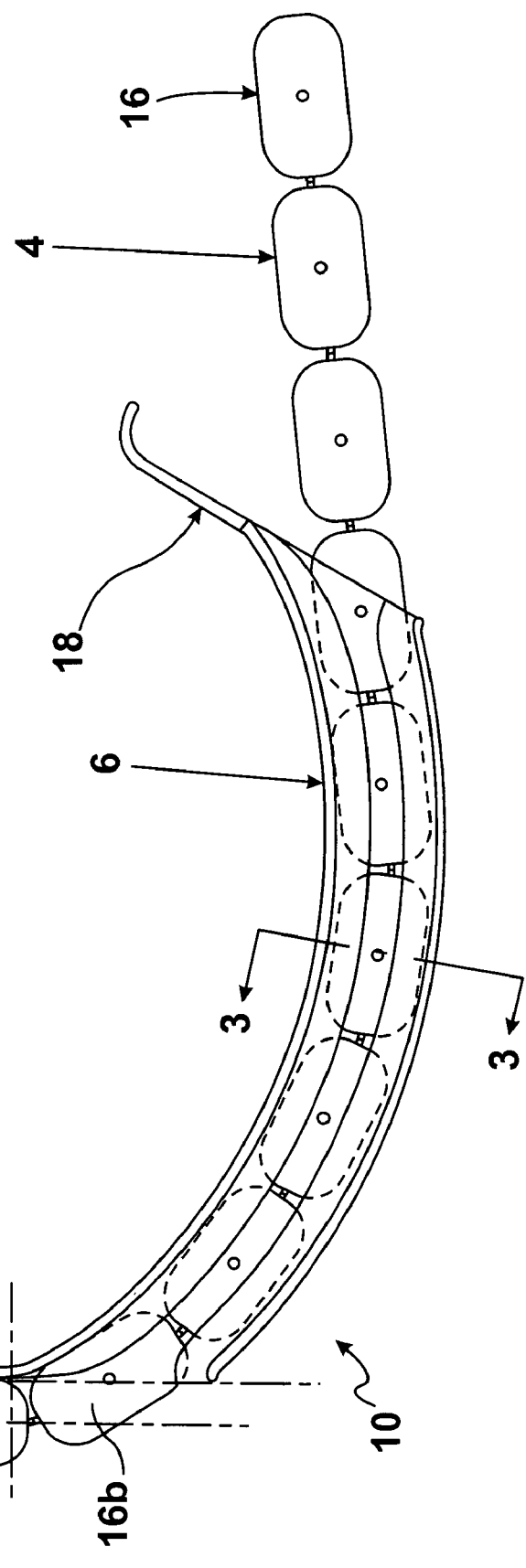
FIG. 2 is an enlarged diagrammatic top plan view of the interconnected and on-site severable deck clips with cooperating installation tool of the embodiments of the present invention identified by ARROW 2 in FIG. 1.

The overall configuration of the interconnected and on-site severable deck clips with cooperating installation tool 10 can best be seen FIGS. 2 and 3, which are, respectively, an enlarged diagrammatic top plan view of the interconnected and on-site severable deck clips with cooperating installation tool of the embodiments of the present invention identified by ARROW 2 in FIG. 1, and, a diagrammatic cross sectional view taken along LINE 3-3 in FIG. 2, and as such, will be discussed with reference thereto.

The interconnected and on-site severable deck clips with cooperating installation tool 10 comprise deck clips 16 and an installation tool 18. The deck clips 16 are interconnected and on-site severable, are for attaching to the underlying support structure 14, and are for engaging the two adjacent decking planks 12 so as to fasten the two adjacent decking planks 12 to the underlying support structure 14 without a need for nails or screws to pass through the two adjacent decking planks 12. The installation tool 18 is hand-held, removably receives a number of the deck clips 16, and feeds the deck clips 16 one at a time for fastening to the underlying support structure 14, and when a deck clip 16a is fastened to the underlying support structure 14, the deck clip 16a is severed from the other deck clips 16 in the installation tool 18 and a next deck clip 16b is feed by way of the installation tool 18 for attaching to the underlying support structure 14 and for engaging the two adjacent decking planks 12.

C. The Deck Clips 16

Figure 4:
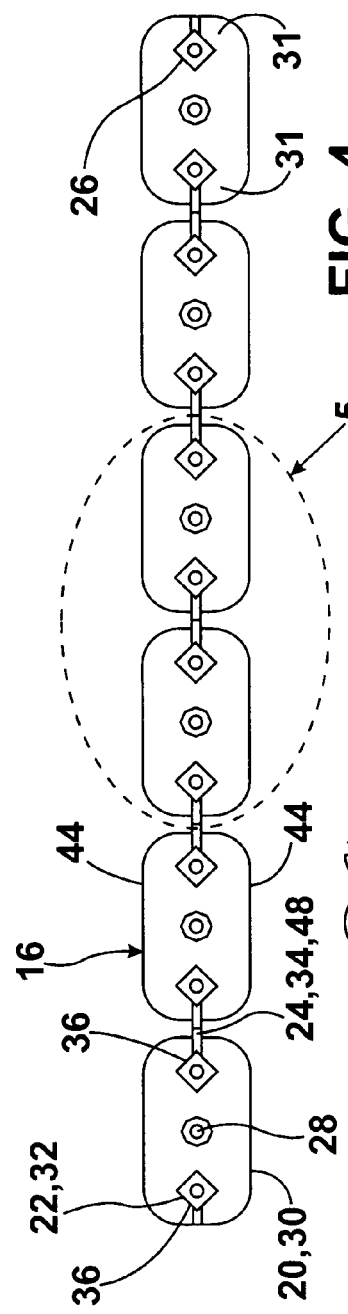
FIG. 4 is a diagrammatic top plan view of the interconnected and on-site severable deck clips of the interconnected and on-site severable deck clips with cooperating installation tool of the embodiments of the present invention identified by ARROW 4 in FIG. 2.
Figure 5:
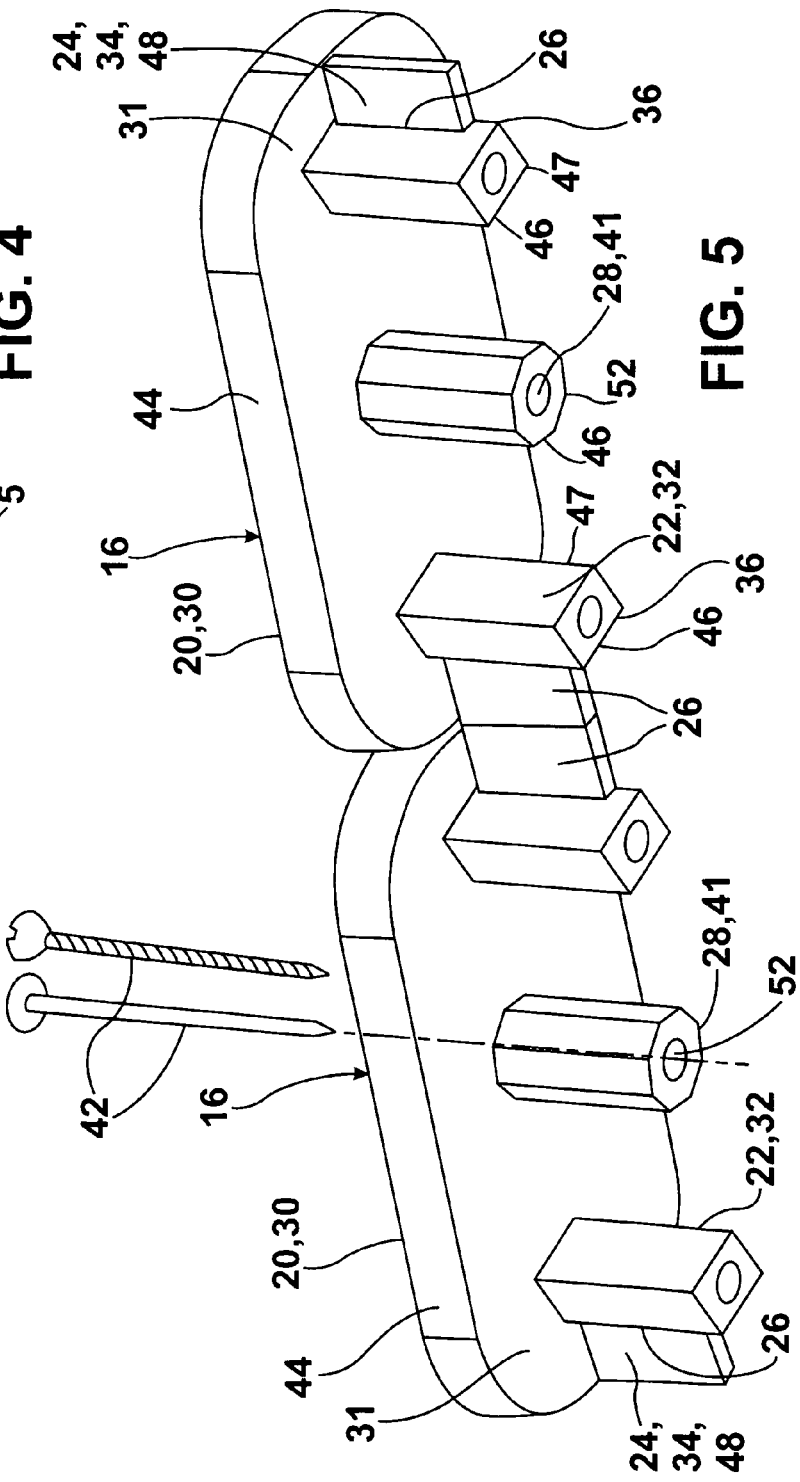
FIG. 5 is an enlarged diagrammatic perspective view of the area generally enclosed by the dotted curve identified by ARROW 5 in FIG. 4 of a pair of adjacent interconnected and on-site severable deck clips of the interconnected and on-site severable deck clips with cooperating installation tool of the embodiments of the present invention.

The specific configuration of the deck clips 16 can best be seen in FIGS. 4 and 5, which are, respectively, a diagrammatic top plan view of the interconnected and on-site severable deck clips of the interconnected and on-site severable deck clips with cooperating installation tool of the embodiments of the present invention identified by ARROW 4 in FIG. 2, and, an enlarged diagrammatic perspective view of the area generally enclosed by the dotted curve identified by ARROW 5 in FIG. 4 of a pair of adjacent interconnected and on-site severable deck clips of the interconnected and on-site severable deck clips with cooperating installation tool of the embodiments of the present invention, and as such, will be discussed with reference thereto.

Each deck clip 16 comprises a first apparatus 20 for allowing engagement of each deck clip 16 with the two adjacent decking planks 12 with/without a need for biscuit slots to be made in the edges 15 of the two adjacent decking planks 12.

Each deck clip 16 further comprises a second apparatus 22 for engaging against the underlying support structure 14.

Each deck clip 16 further comprises a third apparatus 24 for interconnecting adjacent deck clips 16 to each other end-to-end.

Each deck clip 16 further comprises a fourth apparatus 26 for allowing for expansion and contraction of the two adjacent decking planks 12.

Each deck clip 16 further comprises a fifth apparatus 28 for securing each deck clip 16 to the underlying support structure 14 without involving the two adjacent decking planks 12 so as to avoid damage and splintering to the edges 15 of the two adjacent decking planks 12.

The first apparatus 20 includes each deck clip 16 having a head 30. The head 30 of each deck clip 16 has a pair of opposing ends 31, and together with the two adjacent decking planks 12 have cooperating profiles for allowing engagement of each deck clip 16 with the two adjacent decking planks 12 with/without a need for biscuit slots to be made in the edges 15 of the two adjacent decking planks 12.

The second apparatus 22 includes each deck clip 16 having a body 32. The body 32 of each deck clip 16 depends from the head 30 of an associated deck clip 16, has a pair of opposing ends 33, and is for maintaining the head 30 of the associated deck clip 16 a predetermined distance above the underlying support structure 14 so as to account for thickness of the two adjacent decking planks 12.

The third apparatus 24 includes each deck clip 16 having a pair of arms 34. The pair of arms 34 of each deck clip 16 extend from at least a portion of the pair of opposing ends 33 of the body 32 of an associated deck clip 16, respectively, interconnect adjacent deck clips 16 to each other end-to-end, and are on-site severable to separate adjacent deck clips 16 from each other.

The fourth apparatus 26 includes the body 32 of each deck clip 16 having a pair of terminal portions 36. The pair of terminal portions 36 of the body 32 of each deck clip 16 depend from the pair of opposing ends 31 of the head 30 of an associated deck clip 16, respectively, and are for allowing for expansion and contraction of the two adjacent decking planks 12.

The fifth apparatus 28 includes each deck clip 16 having an aperture 41 and a cooperating screw/nail 42. The aperture 41 in each deck clip 16 extends through the head 30 of an associated deck clip 16 and the body 32 of the associated deck clip 16 and receives the screw/nail 42 of the associated deck clip 16 for securing each deck clip 16 to the underlying support structure 14 without involving the two adjacent decking planks 12 so as to avoid damage and splintering to the edges 15 of the two adjacent decking planks 12.

The head 30 of each deck clip 16 is generally rectangular-shaped and has a pair of longitudinal sides 44. The pair of longitudinal sides 44 of the head 30 of each deck clip 16 are profiled for cooperating with profiles in the edges 15 of the two adjacent decking planks 12 for allowing engagement of each deck clip 16 with the two adjacent decking planks 12 with/without a need for biscuit slots to be made in the edges 15 of the two adjacent decking planks 12.

The body 32 of the second apparatus 22 comprises a plurality of pins 46. The plurality of pins 46 of the body 32 of each deck clip 16, each of which being generally cylindrically-shaped, include a pair of terminal pins 47, depend from the head 30 of an associated deck clip 16, and are for maintaining the head 30 of the associated deck clip 16 a predetermined distance above the underlying support structure 14 so as to account for thickness of the two adjacent decking planks 12.

The pair of arms 34 of each deck clip 16 are a pair of resilient tabs 48. The pair of resilient tabs 48 of each deck clip 16 extend from at least a portion of the pair of terminal pins 47 of the plurality of pins 46 of the body 32 of each deck clip 16 and interconnect adjacent deck clips 16 to each other end-to-end, while allowing the adjacent deck clips 16 to pivot relative to each other as each deck clip 16 passes along through the installation tool 18.

The pair of terminal pins 47 of the plurality of pins 46 of the body 32 of each deck clip 16 are generally diamond-shaped in lateral cross section and are for allowing for expansion and contraction of the two adjacent decking planks 12.

The aperture 41 in each deck clip 16 extends through the head 30 of an associated deck clip 16 and at least a center pin 52 of the plurality of pins 46 of the body 32 of the associated deck clip 16 and receives the screw/nail 42 of the associated deck clip 16 for securing each deck clip 16 to the underlying support structure 14 without involving the two adjacent decking planks 12 so as to avoid damage and splintering to the edges 15 of the two adjacent decking planks 12.

D. The Installation Tool 18

The specific configuration of the installation tool 18 can best be seen in FIGS. 6 and 7, which are, respectively, a diagrammatic perspective view of the cooperating installation tool of the interconnected and on-site severable deck clips with cooperating installation tool of the embodiments of the present invention identified by ARROW 6 in FIG. 2, and, a diagrammatic top plan view taken generally in the direction of ARROW 7 in FIG. 6, and as such, will be discussed with reference thereto.

The installation tool 18 comprises a sixth apparatus 53 for maintaining the deck clips 16 in-line end-to-end prior to fastening.

The installation tool 18 further comprises a seventh apparatus 54 for feeding the deck clips 16 one-by-one from the sixth apparatus 53 by either a left- or a right-handed user.

The installation tool 18 further comprises an eighth apparatus 56 for maintaining a deck clip 16 fed by the seventh apparatus 54 in position against a previously attached decking plank 12 for fastening to the underlying support structure 14.

The installation tool 18 further comprises a ninth apparatus 57 for allowing the screw/nail 42 of the fifth apparatus 28 to be positioned in the aperture 41 of the fifth apparatus 28 while the deck clip 16 is still in the sixth apparatus 53.

The sixth apparatus 53 includes a body 58. The body 58 of the installation tool 18 maintains the deck clips 16 in-line end-to-end prior to fastening.

The seventh apparatus 54 includes a mouth/tail 60. The mouth/tail 60 of the installation tool 18 is disposed at each end 62 of the body 58 of the installation tool 18, respectively, and feeds the deck clips 16 maintained in-line end-to-end by the body 58 of the installation tool 18 one-by-one by either a left- or right-handed user and permits more deck clips 16 to be used than the body 58 of the installation tool 18 can hold by having the interconnected deck clips 16 extend out of the tail 60 of the installation tool 18.

When a left-handed user uses the installation tool 18, one end 62 of the body 58 of the installation tool 18 functions as the mouth 60 of the installation tool 18 feeding the deck clips 16 one-by-one, and the other end 62 of the body 58 of the installation tool 18 functions as the tail 60 of the installation tool 18 permitting more deck clips 16 to be used than the body 58 of the installation tool 18 can hold by having the interconnected deck clips 16 extend out of the tail 60 of the installation tool 18.

When a right-handed user uses the installation tool 18, the other end 62 of the body 58 of the installation tool 18 functions as the mouth 60 of the installation tool 18 feeding the deck clips 16 one-by-one, and the one end 62 of the body 58 of the installation tool 18 functions as the tail 60 of the installation tool 18 permitting more deck clips 16 to be used than the body 58 of the installation tool 18 can hold by having the interconnected deck clips 16 extend out of the tail 60 of the installation tool 18.

The eighth apparatus 56 includes a guide 64. The guide 64 of the installation tool 18 extends from the mouth/tail 60 of each end 62 of the body 60 of the installation tool 18 and maintains the deck clip 16 fed by the mouth 60 of the installation tool 18 in position against a previously attached decking plank 12 for fastening to the underlying support structure 14.

The ninth apparatus 57 includes the body 58 of the installation tool 18 having a partially open top 66 for allowing the screw/nail 42 of each deck clip 16 to be positioned in the aperture 41 in an associated deck clip 16 while the associated deck clip 16 is still in the body 58 of the installation tool 18.

The body 58 of the installation tool 18 is slender, elongated, generally U-shaped in lateral cross section, and maintains the deck clips 16 in-line end-to-end prior to fastening.

The body 58 of the installation tool 18 has a floor 68, a pair of side walls 70, and a pair of flanges 72. The pair of side walls 70 of the body 58 of the installation tool 18 extend upwardly from the floor 68 of the body 58 of the installation tool 18, respectively, to a pair of terminal edges 74, respectively. The pair of flanges 72 of the body 58 of the installation tool 18 extend inwardly from the pair of terminal edges 74 of the pair of side walls 70 of the body 58 of the installation tool 18, respectively, to short of each other to provide a space 76 therebetween while preventing the deck clips 16 loaded into the body 58 of the installation tool 18 from falling out of the space 76 between the pair of flanges 72 of the body 58 of the installation tool 18.

The body 58 of the installation tool 18 is curved for fitting between members of the underlying support structure 14.

The mouth/tail 60 of the installation tool 18 has the pair of side walls 70 of the body 58 of the installation tool 18 outwardly flaring at each end 62 of the body 58 of the installation tool 18 to facilitate feeding the deck clips 16 maintained in-line end-to-end by the body of the installation tool 18 one-by-one by either a left- or right-handed user and to permit more deck clips 16 to be used than the body 58 of the installation tool 18 can hold by having the interconnected deck clips 16 extend out of the tail 60 of the installation tool 18.

The guide 64 of the installation tool 18 extends from a same side wall 70 of the body 58 of the installation tool 18 at each end 62 of the body 58 of the installation tool 18 and is generally J-shaped and inwardly curving to partially capture the deck clip 16 fed by the mouth 60 of the installation tool 18 in position against a previously attached decking plank 12 for fastening to the underlying support structure 14.

The partially open top 66 of the body 58 of the installation tool 18 is provided by the space 76 between the pair of flanges 72 of the body 58 of the installation tool 18 for allowing the screw/nail 42 of each deck clip 16 to be positioned in the aperture 41 in an associated deck clip 16 while the associated deck clip 16 is still in the body 58 of the installation tool 18.

E. Conclusions

It will be understood that each of the elements described above or two or more together may also find a useful application in other types of constructions differing from the types described above.

While the embodiments of the present invention have been illustrated and described as embodied in interconnected and on-site severable deck clips with cooperating installation tool for joining two adjacent decking planks to an underlying support structure, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt it for various applications without omitting features that from the standpoint of prior art fairly constitute characteristics of the generic or specific aspects of the embodiments of the present invention.

The invention claimed is:

1. A deck assembling system utilizing interconnected and on-site severable deck clips with cooperating installation tool for joining two adjacent decking planks to an underlying support structure, wherein the two adjacent decking planks have edges, comprising:
   a) deck clips; and
   b) an installation tool;
   wherein said deck clips are interconnected;
   wherein said deck clips having a body, a generally cylindrically-shaped pin extending from said body, and at least one arm attached at the top to said body, attached at one side to said pin, and the other side attached to an arm of an adjacent clip;
   wherein said deck clips are on-site severable;
   wherein said deck clips are for attaching to the underlying support structure;
   wherein said deck clips are for engaging the two adjacent decking planks so as to fasten the two adjacent decking planks to the underlying support structure without a need for nails or screws to pass through the two adjacent decking planks;
   wherein said installation tool is hand-held; and
   wherein said installation tool removably receives a number of said deck clips, and feeds said deck clips one at a time for fastening to the underlying support structure, and when a deck clip is fastened to the underlying support structure, said deck clip is severed from the other deck clips in said installation tool and a next deck clip is feed by way of said installation tool for attaching to the underlying support structure and for engaging the two adjacent decking planks.

2. The combination of claim 1, wherein each deck clip comprises first means for allowing engagement of each deck clip with the two adjacent decking planks with/without a need for biscuit slots to be made in the edges of the two adjacent decking planks.

3. The combination of claim 1, wherein each deck clip comprises second means for engaging against the underlying support structure.

4. The combination of claim 1, wherein each deck clip comprises third means for interconnecting adjacent deck clips to each other end-to-end.

5. The combination of claim 1, wherein each deck clip comprises fourth means for allowing for expansion and contraction of the two adjacent decking planks.

6. The combination of claim 1, wherein each deck clip comprises fifth means for securing each deck clip to the underlying support structure without involving the two adjacent decking planks so as to avoid damage and splintering to the edges of the two adjacent decking planks.

7. The combination of claim 2, wherein said first means includes each deck clip having a head;
   wherein said head of each deck clip has a pair of opposing ends; and
   wherein said head of each deck clip and the two adjacent decking planks have cooperating profiles for allowing engagement of each deck clip with the two adjacent decking planks with/without a need for biscuit slots to be made in the edges of the two adjacent decking planks.

8. The combination of claim 7, wherein said second means includes each deck clip having said body;
   wherein said body of each deck clip depends from said head of an associated deck clip;
   wherein said body of each deck clip has a pair of opposing ends; and wherein said body of each deck clip is for maintaining said head of an associated deck clip a predetermined distance above the underlying support structure so as to account for thickness of the two adjacent decking planks.

9. The combination of claim 8, wherein said third means includes each deck clip having said pair of arms;
wherein said pair of arms of each deck clip extend from at least a portion of said pair of opposing ends of said body of an associated deck clip, respectively;
wherein said pair of arms of each deck clip interconnect adjacent deck clips to each other end-to-end; and
wherein said pair of arms of each deck clip are on-site severable to separate adjacent deck clips from each other.

10. The combination of claim 7, wherein said fourth means includes said body of each deck clip having a pair of terminal portions;
wherein said pair of terminal portions of said body of each deck clip depend from said pair of opposing ends of said head of an associated deck clip, respectively; and
wherein said pair of terminal portions of said body of each deck clip are for allowing for expansion and contraction of the two adjacent decking planks.

11. The combination of claim 8, wherein said fifth means includes each deck clip having an aperture;
wherein said fifth means includes each deck clip having a cooperating screw/nail;
wherein said aperture in each deck clip extends through said head of an associated deck clip and said body of said associated deck clip; and
wherein said aperture in each deck clip receives said screw/nail of an associated deck clip for securing each deck clip to the underlying support structure without involving the two adjacent decking planks so as to avoid damage and splintering to the edges of the two adjacent decking planks.

12. The combination of claim 7, wherein said head of each deck clip is generally rectangular-shaped.

13. The combination of claim 7, wherein said head of each deck clip has a pair of longitudinal sides; and
wherein said pair of longitudinal sides of said head of each deck clip are profiled for cooperating with profiles in the edges of the two adjacent decking planks for allowing engagement of each deck clip with the two adjacent decking planks with/without a need for biscuit slots to be made in the edges of the two adjacent decking planks.

14. The combination of claim 11, wherein said body of each deck clip comprises a plurality of pins;
wherein said plurality of pins of said body of each deck clip depend from said head of an associated deck clip;
wherein said plurality of pins of said body of each deck clip include a pair of terminal pins; and
wherein said plurality of pins of said body of each deck clip are for maintaining said head of an associated deck clip a predetermined distance above the underlying support structure so as to account for thickness of the two adjacent decking planks.

15. The combination of claim 14, wherein said pair of arms of each deck clip are a pair of resilient tabs;
wherein said pair of resilient tabs of each deck clip extend from at least a portion of said pair of terminal pins of said body of an associated deck clip, respectively;
wherein said pair of resilient tabs of each deck clip interconnect adjacent deck clips to each other end-to-end;
wherein said pair of resilient tabs of each deck clip are severable to separate said adjacent deck clips from each other; and
wherein said pair of resilient tabs of each deck clip are for allowing said adjacent deck clips to pivot relative to each other as each deck clips passes along through the installation tool.

16. The combination of claim 14, wherein said pair of terminal pins of said plurality of pins of said body of each deck clip are generally diamond-shaped in lateral cross section; and
wherein said pair of terminal pins of said plurality of pins of said body of each deck clip are for allowing for expansion and contraction of said two adjacent decking planks.

17. The combination of claim 14, wherein said aperture in each deck clip extends through said head of an associated deck clip and at least a center pin of said plurality of pins of said body of said associated deck clip; and
wherein said aperture in each deck clip receives said screw/nail of an associated deck clip for securing each deck clip to the underlying support structure without involving the two adjacent decking planks so as to avoid damage and splintering to the edges of the two adjacent decking planks.

18. The combination of claim 11, wherein said installation tool comprises a sixth means for maintaining said deck clips in-line end-to-end prior to fastening.

19. The combination of claim 18, wherein said installation tool comprises a seventh apparatus for feeding said deck clips one-by-one from said sixth apparatus by either a left- or a right-handed user.

20. The combination of claim 19, wherein said installation tool comprises an eighth apparatus for maintaining a deck clip fed by said seventh apparatus in position against a previously attached decking plank for fastening to the underlying support structure.

21. The combination of claim 18, wherein said installation tool comprises a ninth apparatus for allowing said screw/nail of said fifth apparatus to be positioned in said aperture of said fifth apparatus while said deck clip is still in said sixth apparatus.

22. The combination of claim 20, wherein said sixth means includes a body; and
wherein said body of said installation tool maintains said deck clips in-line end-to-end prior to fastening.

23. The combination of claim 22, wherein said seventh apparatus includes a mouth/tail;
wherein said mouth/tail of said installation tool is disposed at each end of said body of said installation tool, respectively;
wherein said mouth/tail of said installation tool feeds said deck clips maintained in-line end-to-end by said body of said installation tool one-by-one by either a left- or right-handed user;
wherein said mouth/tail of said installation tool permits more deck clips to be used than said body of said installation tool can hold by having said interconnected deck clips extend out of said tail of said installation tool;
wherein one end of said body of said installation tool functions as said mouth of said installation tool feeding said deck clips one-by-one, and the other end of said body of said installation tool functions as said tail of said installation tool permitting more deck clips to be used than said body of said installation tool can hold by having said interconnected deck clips extend out of said tail of said installation tool when a left-handed user uses said installation tool; and
wherein said other end of said body of said installation tool functions as said mouth of said installation tool feeding said deck clips one-by-one, and said one end of said body of said installation tool functions as said tail of said installation tool permitting more deck clips to be used than said body of said installation tool can hold by having said interconnected deck clips extend out of said tail of said installation tool when a right-handed user uses said installation tool.

24. The combination of claim 23, wherein said eighth apparatus includes a guide; and
   wherein said guide of said installation tool extends from said mouth/tail of each end of said body of said installation tool; and
   wherein said guide of said installation tool maintains said deck clip fed by said mouth of said installation tool in position against a previously attached decking plank for fastening to the underlying support structure.

25. The combination of claim 24, wherein said ninth apparatus includes said body of said installation tool having a partially open top for allowing said screw/nail of each deck clip to be positioned in said aperture in an associated deck clip while said associated deck clip is still in said body of said installation tool.

26. The combination of claim 22, wherein said body of said installation tool is slender;
   wherein said body of said installation tool is elongated;
   wherein said body of said installation tool is generally U-shaped in lateral cross section; and
   wherein said body of said installation tool maintains said deck clips in-line end-to-end prior to fastening.

27. The combination of claim 25, wherein said body of said installation tool has a floor;
   wherein said body of said installation tool has a pair of side walls;
   wherein said body of said installation tool has a pair of flanges;
   wherein said pair of side walls of said body of said installation tool extend upwardly from said floor of said body of said installation tool, respectively, to a pair of terminal edges, respectively; and
   wherein said pair of flanges of said body of said installation tool extend inwardly from said pair of terminal edges of said pair of side walls of said body of said installation tool, respectively, to short of each other to provide a space therebetween and prevent said deck clips loaded into said body of said installation tool from falling out of said space between said pair of flanges of said body of said installation tool.

28. The combination of claim 22, wherein said body of said installation tool is curved for fitting between members of the underlying support structure.

29. The combination of claim 23, wherein said mouth, tail of said installation tool has said pair of side walls of said body of said installation tool outwardly flaring at each end of said body of said installation tool to facilitate feeding said deck clips maintained in-line end-to-end by said body of said installation tool one-by-one by either a left- or right-handed user and to permit more deck clips to be used than said body of said installation tool can hold by having said interconnected deck clips extend out of said tail of said installation tool.

30. The combination of claim 27, wherein said guide of said installation tool extends from a same side wall of said body of said installation tool at each end of said body of said installation tool; and
   wherein said guide of said installation tool is generally J-shaped and inwardly curving to partially capture said deck clip fed by said mouth of said installation tool in position against a previously attached decking plank for fastening to the underlying support structure.

31. The combination of claim 27, wherein said partially open top of said body of said installation tool is provided by said space between said pair of flanges of said body of said installation tool for allowing said screw/nail of each deck clip to be positioned in said aperture in an associated deck clip while said associated deck clip is still in said body of said installation tool.

32. Interconnected and on-site severable deck clips for dispensing from a cooperating installation tool for joining two adjacent decking planks to an underlying support structure, wherein the two adjacent decking planks have edges, comprising deck clips;
   wherein said deck clips are interconnected;
   wherein said deck clips having a body and a generally cylindrically-shaped pin extending from said body, and at least one arm attached at the top to said body, attached at one side to said pin, and the other side attached to a tab;
   wherein said deck clips are on-site severable;
   wherein said deck clips are for attaching to the underlying support structure; and
   wherein said deck clips are for engaging the two adjacent decking planks so as to fasten the two adjacent decking planks to the underlying support structure without a need for nails or screws to pass through the two adjacent decking planks.

33. The combination of claim 32, wherein each deck clip comprises first means for allowing engagement of each deck clip with the two adjacent decking planks with/without a need for biscuit slots to be made in the edges of the two adjacent decking planks.

34. The combination of claim 32, wherein each deck clip comprises second means for engaging against the underlying support structure.

35. The combination of claim 32, wherein each deck clip comprises third means for interconnecting adjacent deck clips to each other end-to-end.

36. The combination of claim 32, wherein each deck clip comprises fourth means for allowing for expansion and contraction of the two adjacent decking planks.

37. The combination of claim 32, wherein each deck clip comprises fifth means for securing each deck clip to the underlying support structure without involving the two adjacent decking planks so as to avoid damage and splintering to the edges of the two adjacent decking planks.

38. The combination of claim 33, wherein said first means includes each deck clip having a head;
   wherein said head of each deck clip has a pair of opposing ends; and
   wherein said head of each deck clip and the two adjacent decking planks have cooperating profiles for allowing engagement of each deck clip with the two adjacent decking planks with/without a need for biscuit slots to be made in the edges of the two adjacent decking planks.

39. The combination of claim 38, wherein said second means includes each deck clip having said body;
   wherein said body of each deck clip depends from said head of an associated deck clip;
   wherein said body of each deck clip has a pair of opposing ends; and
   wherein said body of each deck clip is for maintaining said head of an associated deck clip a predetermined distance above the underlying support structure so as to account for thickness of the two adjacent decking planks.

40. The combination of claim 39, wherein said third means includes each deck clip having a pair of arms;
   wherein said pair of arms of each deck clip extend from at least a portion of said pair of opposing ends of said body of an associated deck clip, respectively;
   wherein said pair of arms of each deck clip interconnect adjacent deck clips to each other end-to-end; and
   wherein said pair of arms of each deck clip are on-site severable to separate adjacent deck clips from each other.

41. The combination of claim 38, wherein said fourth means includes said body of each deck clip having a pair of terminal portions;
   wherein said pair of terminal portions of said body of each deck clip depend from said pair of opposing ends of said head of an associated deck clip, respectively; and
   wherein said pair of terminal portions of said body of each deck clip are for allowing for expansion and contraction of the two adjacent decking planks.

42. The combination of claim 40, wherein said fifth means includes each deck clip having an aperture;
   wherein said fifth means includes each deck clip having a cooperating screw/nail;
   wherein said aperture in each deck clip extends through said head of an associated deck clip and said body of said associated deck clip; and
   wherein said aperture in each clip receives said screw/nail of an associated deck clip for securing each deck clip to the underlying support structure without involving the two adjacent decking planks so as to avoid damage and splintering to the edges of the two adjacent decking planks.

43. The combination of claim 38, wherein said head of each deck clip is generally rectangular-shaped.

44. The combination of claim 38, wherein said head of each deck clip has a pair of longitudinal sides; and
   wherein said pair of longitudinal sides of said head of each deck clip are profiled for cooperating with profiles in the edges of the two adjacent decking planks for allowing engagement of each deck clip with the two adjacent decking planks with/without a need for biscuit slots to be made in the edges of the two adjacent decking planks.

45. The combination of claim 42, wherein said body of each deck clip further comprises a plurality of pins;
   wherein said plurality of pins of said body of each deck clip depend from said head of an associated deck clip;
   wherein said plurality of pins of said body of each deck clip include a pair of terminal pins; and
   wherein said plurality of pins of said body of each deck clip are for maintaining said head of an associated deck clip a predetermined distance above the underlying support structure so as to account for thickness of the two adjacent decking planks.

46. The combination of claim 45, wherein said pair of arms of each deck clip are a pair of resilient tabs;
   wherein said pair of resilient tabs of each deck clip extend from at least a portion of said pair of terminal pins of said body of an associated deck clip, respectively;
   wherein said pair of resilient tabs of each deck clip interconnect adjacent deck clips to each other end-to-end;
   wherein said pair of resilient tabs of each deck clip are severable to separate said adjacent deck clips from each other; and
   wherein said pair of resilient tabs of each deck clip are for allowing said adjacent deck clips to pivot relative to each other as each deck clips passes along through the installation tool.

47. The combination of claim 45, wherein said pair of terminal pins of said plurality of pins of said body of each deck clip are generally diamond-shaped in lateral cross section; and
   wherein said pair of terminal pins of said plurality of pins of said body of each deck clip are for allowing for expansion and contraction of said two adjacent decking planks.

48. The combination of claim 45, wherein said aperture in each deck clip extends through said head of an associated deck clip and at least a center pin of said plurality of pins of said body of said associated deck clip; and
   wherein said aperture in each deck clip receives said screw/nail of an associated deck clip for securing each deck clip to the underlying support structure without involving the two adjacent decking planks so as to avoid damage and splintering to the edges of the two adjacent decking planks.

49. An installation tool for dispensing deck clips for joining two adjacent decking planks to an underlying support structure, comprising an installation tool;
   wherein said installation tool is hand-held;
   wherein said installation tool has a curved body, said body has at least one wall and at least one terminal edge, at least one flange attached to said wall and extending inwardly for said edge providing a space,
   wherein said installation tool is for removably receiving a number of the deck clips; and
   wherein said installation tool is for feeding the deck clips one at a time for fastening to the underlying support structure, and when a deck clip is fastened to the underlying support structure, the deck clip is severed from the other deck clips in said installation tool and a next deck clip is feed by way of said installation tool for attaching to the underlying support structure and for engaging the two adjacent decking planks.

50. The combination of claim 49, wherein said installation tool comprises first means for maintaining the deck clips in-line end-to-end prior to fastening.

51. The combination of claim 50, wherein said installation tool comprises second means for feeding the deck clips one-by-one from said first means by either a left- or a right-handed user.

52. The combination of claim 51, wherein said installation tool comprises third means for maintaining a deck clip fed by said second means in position against a previously attached decking plank for fastening to the underlying support structure.

53. The combination of claim 50, wherein said installation tool comprises fourth means for allowing a screw/nail of each deck clip to be positioned in an aperture in an associated deck clip while the associated deck clip is still in said installation tool.

54. The combination of claim 52, wherein said first means of said installation tool includes said body; and
   wherein said body of said installation tool is for maintaining the deck clips in-line end-to-end prior to fastening.

55. The combination of claim 54, wherein said second means of said installation tool includes a mouth/tail;
   wherein said mouth/tail of said installation tool is disposed at each end of said body of said installation tool, respectively;
   wherein said mouth/tail of said installation tool is for feeding the deck clips maintained in-line end-to-end by said body of said installation tool one-by-one by either a left- or right-handed user;

wherein said mouth/tail of said installation tool is for permitting more deck clips to be used than said body of said installation tool can hold by having the interconnected deck clips extend out of said tail of said installation tool;

wherein one end of said body of said installation tool functions as said mouth of said installation tool for feeding the deck clips one-by-one, and the other end of said body of said installation tool functions as said tail of said installation tool for permitting more deck clips to be used than said body of said installation tool can hold by having the interconnected deck clips extend out of said tail of said installation tool when a left-handed user uses said installation tool; and wherein said other end of said body of said installation tool functions as said mouth of said installation tool for feeding the deck clips one-by-one, and said one end of said body of said installation tool functions as said tail of said installation tool for permitting more deck clips to be used than said body of said installation tool can hold by having the interconnected deck clips extend out of said tail of said installation tool when a right-handed user uses said installation tool.

56. The combination of claim 55, wherein said third means of said installation tool includes a guide;

wherein said guide of said installation tool extends from said mouth/tail of each end of said body of said installation tool; and wherein said guide of said installation tool is for maintaining the deck clip fed by said mouth of said installation tool in position against a previously attached decking plank for fastening to the underlying support structure.

57. The combination of claim 56, wherein said fourth means of said installation tool includes said body of said installation tool having a partially open top for allowing the screw/nail of each deck clip to be positioned in the aperture in an associated deck clip while the associated deck clip is still in said body of said installation tool.

58. The combination of claim 54, wherein said body of said installation tool is slender;

wherein said body of said installation tool is elongated;

wherein said body of said installation tool is generally U-shaped in lateral cross section; and wherein said body of said installation tool is for maintaining the deck clips in-line end-to-end prior to fastening.

59. The combination of claim 57, wherein said body of said installation tool has a floor;

wherein said body of said installation tool has a pair of side walls;

wherein said body of said installation tool has a pair of flanges;

wherein said pair of side walls of said body of said installation tool extend upwardly from said floor of said body of said installation tool to a pair of terminal edges, respectively;

wherein said pair of flanges of said body of said installation tool extend inwardly from said pair of terminal edges of said pair of side walls of said body of said installation tool, respectively, to short of each other to provide said space therebetween; and wherein said pair of flanges of said body of said installation tool are for preventing the deck clips loaded into said body of said installation tool from falling out of said space between said pair of flanges of said body of said installation tool.

60. The combination of claim 55, wherein said mouth/tail of said installation tool has said pair of side walls of said body of said installation tool outwardly flaring at each end of said body of said installation tool for facilitating feeding the deck clips maintained in-line end-to-end by said body of said installation tool one-by-one by either a left- or right-handed user and for permitting more deck clips to be used than said body of said installation tool can hold by having the interconnected deck clips extend out of said tail of said installation tool.

61. The combination of claim 59, wherein said guide of said installation tool extends from a same side wall of said body of said installation tool at each end of said body of said installation tool; and wherein said guide of said installation tool is generally J-shaped and inwardly curving for partially capturing the deck clip fed by said mouth of said installation tool in position against a previously attached decking plank for fastening to the underlying support structure.

62. The combination of claim 59, wherein said partially open top of said body of said installation tool is provided by said space between said pair of flanges of said body of said installation tool for allowing the screw/nail of each deck clip to be positioned in the aperture in an associated deck clip while the associated deck clip is still in said body of said installation tool.

\* \* \* \* \*